United States Patent
Levy et al.

(10) Patent No.: US 8,611,749 B2
(45) Date of Patent: Dec. 17, 2013

(54) TECHNOLOGY FOR ARRANGING OPTICAL CHANNELS IN SWITCHING OPTICAL EQUIPMENT

(75) Inventors: Avi Levy, Ramat-Gan (IL); Eyal Lichtman, Ramat-Gan (IL)

(73) Assignee: ECI Telecom Ltd., Petach-Tikva (IL)

( * ) Notice: Subject to any disclaimer, the term of this patent is extended or adjusted under 35 U.S.C. 154(b) by 106 days.

(21) Appl. No.: 13/287,678

(22) Filed: Nov. 2, 2011

(65) Prior Publication Data

US 2012/0121261 A1    May 17, 2012

(30) Foreign Application Priority Data

Nov. 11, 2010  (IL) .......................................... 209251

(51) Int. Cl.
*H04J 14/02* (2006.01)
*H04J 14/00* (2006.01)

(52) U.S. Cl.
USPC ................... 398/85; 398/43; 398/48; 398/82; 398/83

(58) Field of Classification Search
None
See application file for complete search history.

(56) References Cited

U.S. PATENT DOCUMENTS

| | | | |
|---|---|---|---|
| 6,907,158 B2 * | 6/2005 | Vohra et al. ...................... | 385/24 |
| 7,184,666 B1 * | 2/2007 | Li et al. ............................ | 398/83 |
| 7,792,428 B2 * | 9/2010 | Akiyama et al. ................. | 398/83 |
| 2009/0180779 A1 | 7/2009 | Boduch et al. | |
| 2009/0226168 A1 | 9/2009 | Boduch | |

* cited by examiner

*Primary Examiner* — Shi K Li
*Assistant Examiner* — Merlin Brito Peguero
(74) *Attorney, Agent, or Firm* — Novick, Kim & Lee, PLLC; Jae Youn Kim (57) ABSTRACT

A reconfigurable optical switching device comprising a Tunable Filters Array (TFA) unit incorporating tunable optical filters, wherein the arrangement is such that one and the same TFA unit is utilized both for performing a drop function of the device in a colorless and reconfigurable manner, and a through function of the device in a reconfigurable manner.

6 Claims, 6 Drawing Sheets

TECHNOLOGY FOR ARRANGING OPTICAL CHANNELS IN SWITCHING OPTICAL EQUIPMENT

CROSS-REFERENCE TO RELATED APPLICATIONS

This application claims priority of Israel Patent Application No. 209251, filed Nov. 11, 2010, the disclosure of which is incorporated by reference herein in its entirety.

FIELD OF THE INVENTION

The present invention relates to a technique of constructing configurations for providing switching and add-drop functions in optical telecommunication lines. The technique is actual for various optical networks and for various optical switching and cross-connecting devices, preferably for reconfigurable OADMs and switches.

BACKGROUND OF THE INVENTION

Many examples of using arrays of tunable filters (TFA) for add/drop function of OADMs, such as reconfigurable OADMs (ROADMs). So-called "colorless" drop function of ROADM (dropping a group of multiplexed channels and further filtering them by a number of tunable filters) are often implemented by TFA, and it can be seen in two prior art examples shown in FIGS. 1 and 2. However, reconfigurable through channels have been implemented by now by a wavelength blocker or a wavelength selective switch WSS. Together, the TFA units and WSS or blockers implement reconfigurable colorless ROADM. Another example of implementing through/express channels in ROADM is using a separate TFA unit for that. Such ways of implementing ROADM are described in US2009/0226168 A1.

US2009180779 describes an embodiment implementing ROADM by utilizing a TFA for an add-drop module. In another embodiment, at least two ROADMs and at least one add/drop module may further include express ports, wherein the number of express ports is a function of the number of ROADMs and add/drop modules.

However, to the best of the Applicant's knowledge, nobody have supposed that implementation of add/drop and through functions of OADM could be done in a more economic way, so as to solve well known problems of organizing optical channels in modern switching optical equipment.

SUMMARY OF THE INVENTION

Surprisingly, nobody have yet proposed combining the implementation of both the add/drop and through functions of OADM in one and the same physical module of TFA, and that is what the Inventors propose. The proposed solution drastically simplifies structure of the reconfigurable OADM, and renders it much more economic.

The inventive concept is to provide a reconfigurable optical switching device comprising a Tunable Filters Array (TFA) unit incorporating tunable optical filters, wherein said TFA unit is utilized both for performing a drop function of the device in a colorless and reconfigurable manner, and a through function of the device in a reconfigurable manner.

According to one aspect of the invention, there is provided a reconfigurable optical switching device (for example, an ROADM or a cross-connecting equipment), utilizing only splitters and TFA units intended for performing the drop function, both for drop and through functions of the switching device in a reconfigurable manner. Actually, the reconfigurable through function (i.e., obtaining reconfigurable through/express channels) is implemented at the expense of tunable filters of the basic TFA unit which is initially intended for obtaining colorless reconfigurable drop channels.

In other words, the Inventors propose a reconfigurable optical switching device utilizing at least one TFA unit comprising tunable optical filters, wherein a group of said tunable filters serve for filtering out drop optical channels, and at least one of said tunable filters is adapted to filter out an express/through optical channel of the device.

The term "colorless" should be understood so that that the drop function is performed in the colorless manner (when a number of optical channels are dropped together, in the mixed form), and then separated into optical channels—usually by an optical splitter and further by tunable filters of the TFA unit. The drop channels therefore become reconfigurable, so the drop function is colorless and reconfigurable.

Actually, according to the invention, a portion of the basic TFA unit (i.e., one or more of its tunable filters) may be utilized for through/express channels, and such through channels are therefore reconfigurable. Indeed, one or more tunable filters of the TFA unit may separate, from its colorless input, some channels to be passed through at the expense of channels which could be dropped. The most important result is that the through channels are implemented without an extra equipment such as a wavelength selective switch WSS or a wavelength blocker (which in the prior art are used for "coloring" and are quite expensive).

The proposed simple and economic arrangement based on the colorless reconfigurable drop function of the TFA unit, in addition to the inventively implemented reconfigurable through function, may be designed for implementing also a reconfigurable add function.

It should be kept in mind that an optical switching device is usually built for two opposite directions of transmission, and therefore comprises a so-called West portion(card) and a so-called East portion (card) which together serve the bidirectional transmission. In such a configuration, any through channel may be passed passively (i.e., multiplexed=mixed with other channels) between the two portions/cards (say, from the West card to the East card) and be then filtered by a tunable filter reserved for a reconfigurable through channel in the TFA unit of the opposite portion/card (in our case, of the East card of the device). In other words, at least one through channel may be filtered from the passive optical flow at the portion from which said through channel is to be outputted. Such implementation is more effective, since it allows transmitting a number of through channels between the portions/cards of the switching device in the passive form, and allows reconfigurable selection of these channels just before outputting thereof.

As proposed by the Inventors, the through channels in the proposed device are served by tunable filters of a TFA unit commonly used by dropped channels on a card, while location of these tunable filters serving the through channels (i.e., location on one or another card of the East-West structure) is not really essential. Moreover, different through channels may respectively use different tunable filters placed on different cards.

Further, as mentioned above, the implementation proposed by the Inventors allows implementing the add operation based on any specific tunable filter out of the TFA unit, so that thus formed added channel easily becomes a configurable channel (which was not possible in the prior art without some extra equipment). The only additional equipment which the add operation requires is a splitter/combiner (1×2 for example). It should be kept in mind, however, that a splitter/combiner would be required in any possible implementation of the add operation.

There is also proposed a method of arranging an express (through) channel in a reconfigurable optical switching device (say, an ROADM device, a cross-connect), the method comprises providing the device with a TFA unit for implementing a drop function of the device, forwarding to the TFA unit (in a mixed, passive form) at least one channel to be expressly passed through the device, selecting said at least one optical channel by filtering it out using at least one (free, reserved, not participating in the drop function) tunable filter of the TFA unit, and connecting the selected channel to an express output of the device, thereby avoiding use of additional equipment for said express channel.

The method may further comprise forwarding to the TFA unit (in the passive form) at least one optical channel to be added to the device, filtering said at least one channel by respective reserved/not utilized tunable filter(s) of the same TFA unit, and combining the obtained add channel with the channels to be outputted from the optical switching device.

BRIEF DESCRIPTION OF THE PREFERRED EMBODIMENTS

The invention will be further described with reference to the following non-limiting examples, in which.

DETAILED DESCRIPTION OF THE INVENTION

Figure 1:
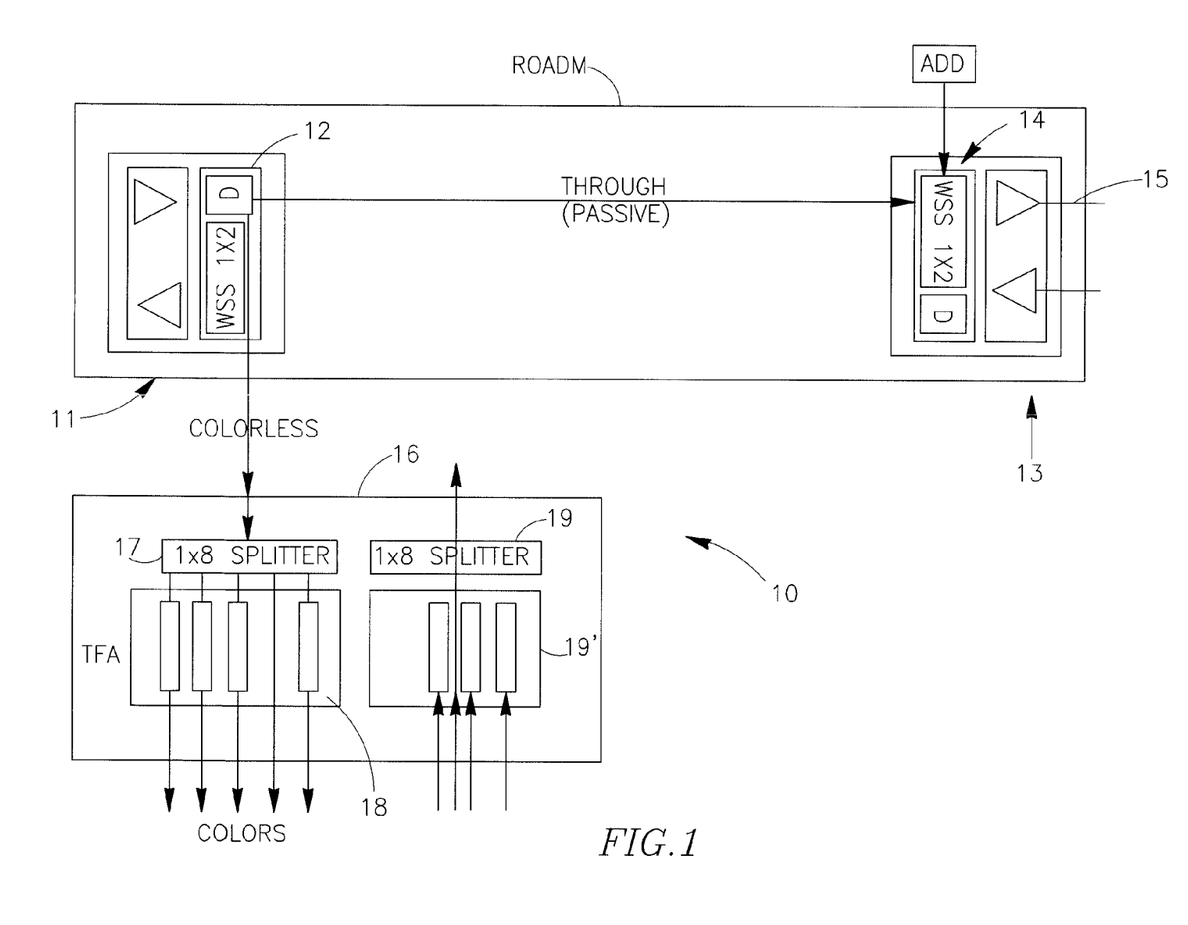
FIG. 1 (prior art) illustrates an example of a conventional ROADM arrangement for optical networks, utilizing a wavelength selective switch (WSS) for selecting required through/express channels.

FIG. 1 (prior art) illustrates an ROADM 10 comprising (at its West end 11) a drop unit 12 for dropping some optical channels. At the East portion 13 of the ROADM, a wavelength selecting switch WSS 14 serves for receiving optical channels arriving in the multiplexed form from the West portion 11 and for selecting out of them the channels which should pass "through" the OADM (so-called through or express channels).

Express channels are to be output via an express output 15 of the ROADM.

The multiplexed channels via a splitter D are "colorlessly" directed to a block 16 (add/drop block), where a splitter 17 divides the signal into 8 portions and tunable filters 18 filter out specific optical channels to be dropped and forwarded to clients. In the module 16, an additional splitter/combiner 19 accompanied with an additional, dedicated TFA unit 19' are intended for performing the Add function of the West portion 11 of the ROADM 10.

The East part 13 of the ROADM 10 performs similar functions for the opposite direction of the optical transmission.

Figure 2:
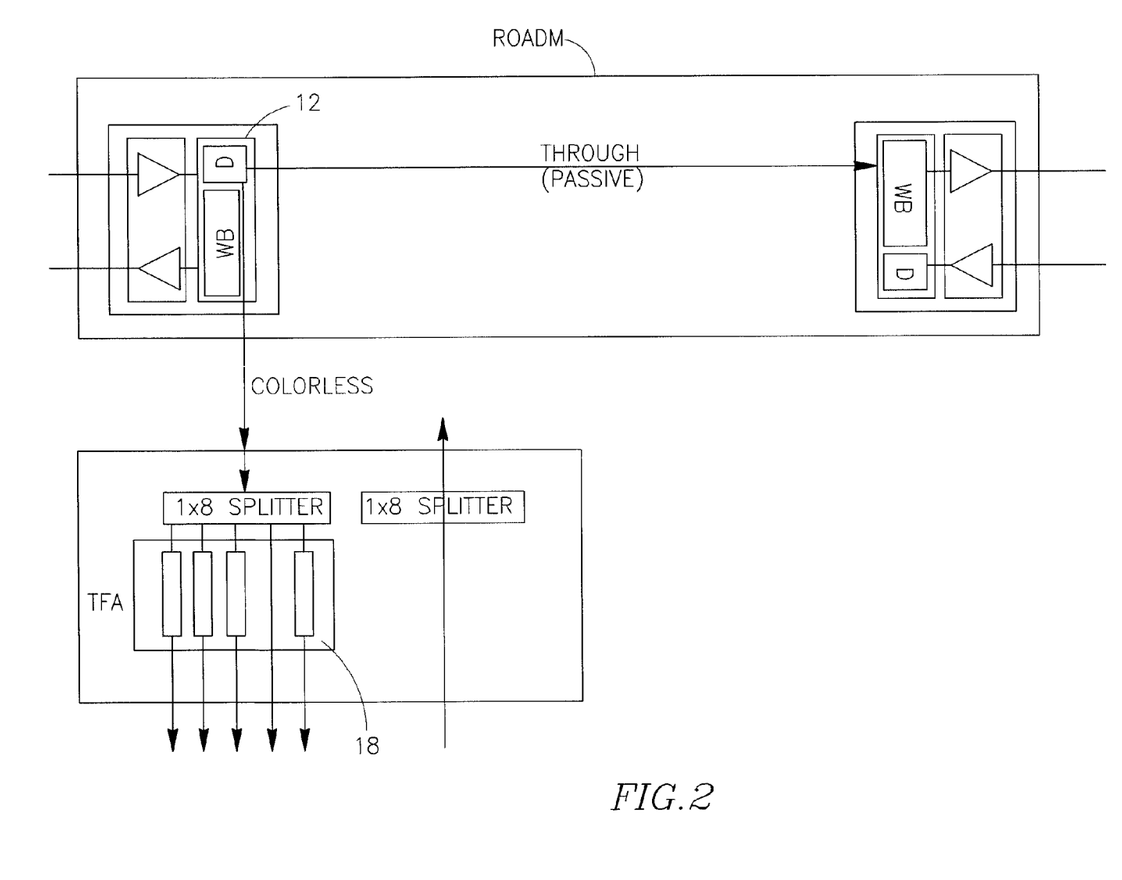
FIG. 2 (prior art) illustrates another example of a conventional ROADM, utilizing a wavelength blocker for separating required through/express optical channels from a group of multiplexed channels.

FIG. 2 illustrates another prior art embodiment of OADM, where instead of the WSS block, a wavelength blocker WB is utilized for extracting through channels from the multiplexed flow of optical channels transmitted between the East and West sides of the OADM.

Figure 3:
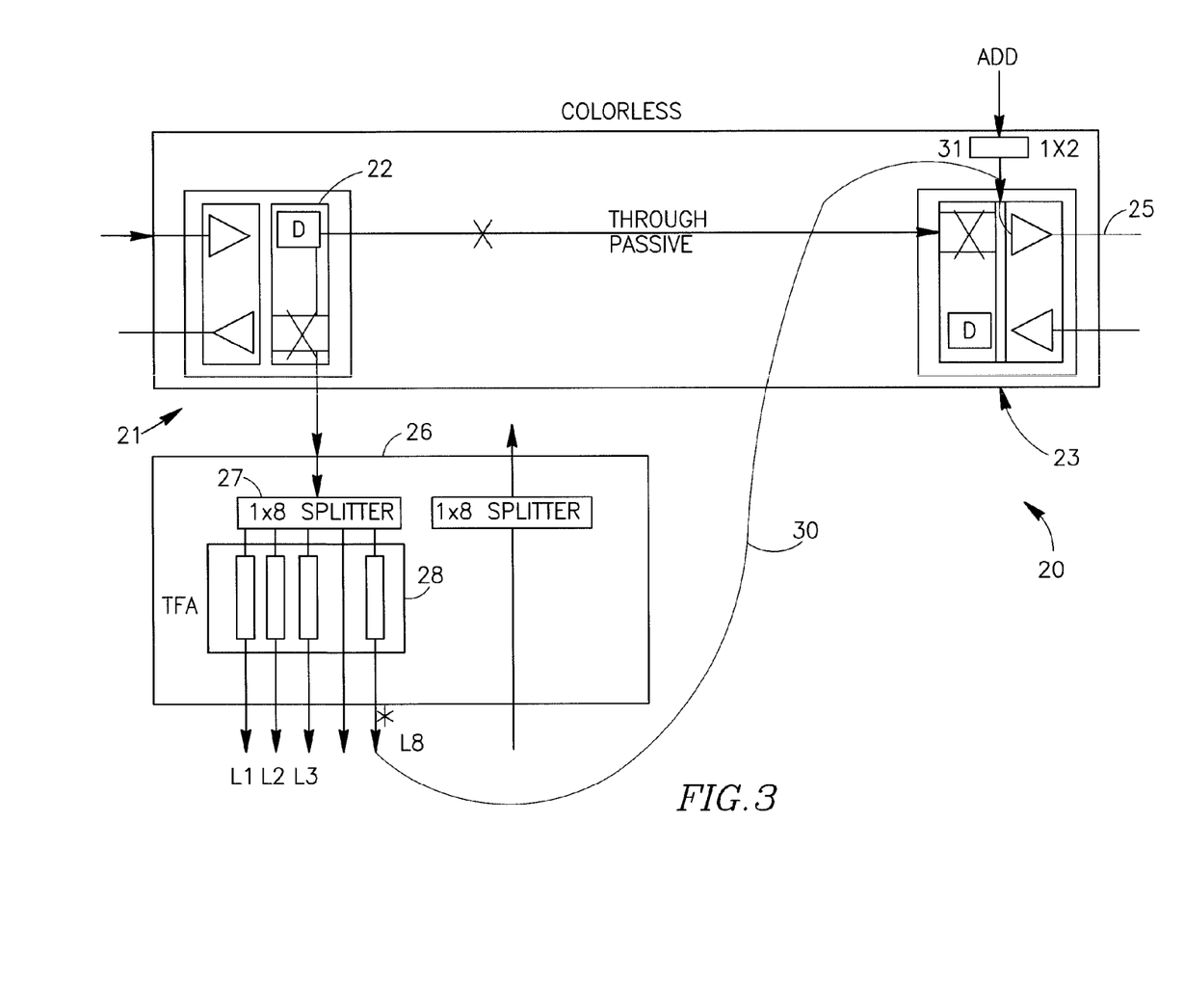
FIG. 3 illustrates one embodiment of the proposed optical switching device, on the example of ROADM, utilizing a TFA block for obtaining configurable dropped channels and through channels.

FIG. 3 illustrates a concept of the proposed optical switching device (in this drawing, on the example of ROADM 20). It should be noted that FIG. 3 illustrates the principle, but not a mandatory implementation.

The Inventors propose a low cost, effective implementation of a reconfigurable optical switching device using only optical splitters and one or more TFA units initially intended and serving for a drop function of the device.

FIG. 3 illustrates an optical switching device (such as a ROADM, cross-connecting network switch or the like) built only on splitters and on basic TFA units being actually drop modules of the device (one unit 28 is shown). The TFA unit 28 is initially intended for a drop function of the device, but also implements a through function, wherein both the drop and the through optical channels produced by it are reconfigurable/tunable.

Example of FIG. 3 may be understood as a colorless ROADM device comprising a drop module implemented on a tunable filters array (TFA) unit, and characterized in that at least one of tunable filters of the TFA unit is utilized for a through channel of the device. In this embodiment, one optical channel (L8) filtered out by the TFA 28 of the drop module 26 of the ROADM is connected to an express output 25 of the ROADM and is utilized as a through channel of the ROADM.

The West portion of the ROADM is marked 21, the East portion—23. The drop module 22 of the West portion (shown below as block 26) receives all the optical channels arriving in the multiplexed form (colorlessly). Let among them there is also at least one specific channel(*, L8) to be expressly passed through the ROADM. As in FIGS. 1 and 2, the multiplexed channels pass through a splitter 27. A number of optical channels (L1, L2, L3) are dropped in a reconfigurable manner by tunable filters of the TFA 28. Further, the Inventors suggest that the specific channel (*) L8 be selected by one of the tunable filters of the TFA unit 28 which is not utilized for the drop operation, and then be directly connected (link 30 in the ROADM 20) to the ROADM express output 25. Note that no other express line exists between the West 21 and East 23 portions of the device (the direct connection which existed in FIGS. 1 and 2 is now symbolically crossed out).

Note also, that no additional, dedicated equipment is required for the proposed arrangement of the through channel (to illustrate that, symbolic places of WSS or Wavelength Blocker in the East and West portions of the proposed device are also crossed out).

Of course, any optical channels may be added at the East portion 23 to the through channels, by combining the express output with any added channel by an optical combiner 31. However, in such implementation, the added channel(s) will be non-configurable. One possibility to make added channels configurable (according to the concept of the invention) will be illustrated in FIG. 5.

Figure 4:
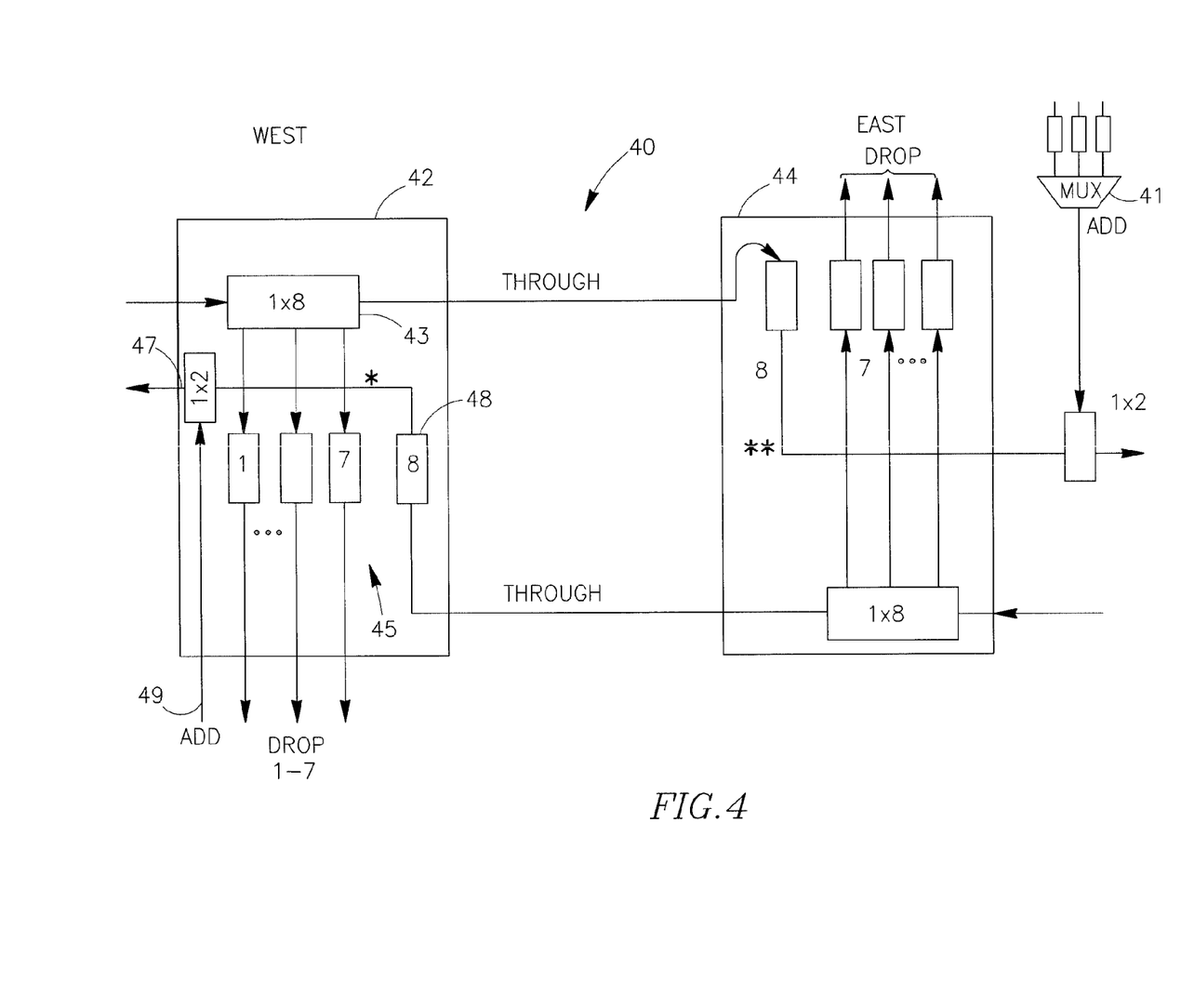
FIG. 4 illustrates an example of a bidirectional configuration of the proposed low cost ROADM, comprising an East portion (card) and a West portion(card) which utilize only TFA units and splitters.

FIG. 4. As has been mentioned in the Summary, one or more optical channels transmitted in the multiplexed form from one to another portion (West, East) of the OADM, may be turned into one or more through channels by applying thereof to respective tunable filters of the TFA unit of that other portion.

FIG. 4 illustrates a more practical embodiment of how a through channel can be implemented in the OADM 40 comprising a West portion 42 and an East portion 44, each with its sole TFA unit. The West portion 42 comprises its TFA unit including, for example, an 1×8 splitter 43 and TFA array 45 with eight tunable filters. Seven of the tunable filters serve each for extracting a specific dropped channel from the portion of energy applied to its input from the splitter 43. The eighth tunable filter 48 is not connected to the splitter 43. It receives multiplexed channels from the East portion 44 and filters out from them a predetermined optical channel which becomes a through channel (marked *) of the OADM in the E-W direction. This through channel may be then combined with an add channel 49 by a simple 1×2 splitter/combiner 47, and they form together the output of the West portion of the OADM. Similar operations may be performed in the East portion 44, with signals in the opposite direction. At the East portion 44, the through channel (**) filtered by the local sole TFA unit, may be combined with one or more add channels using a regular 1×2 combiner. Note, that if one uses a multiplexer 41 with a number of tunable filters, the add channels may be fed in a reconfigurable form. However, such will require a dedicated piece of equipment (MUX 43 and the associated filters 41).

Figure 5:
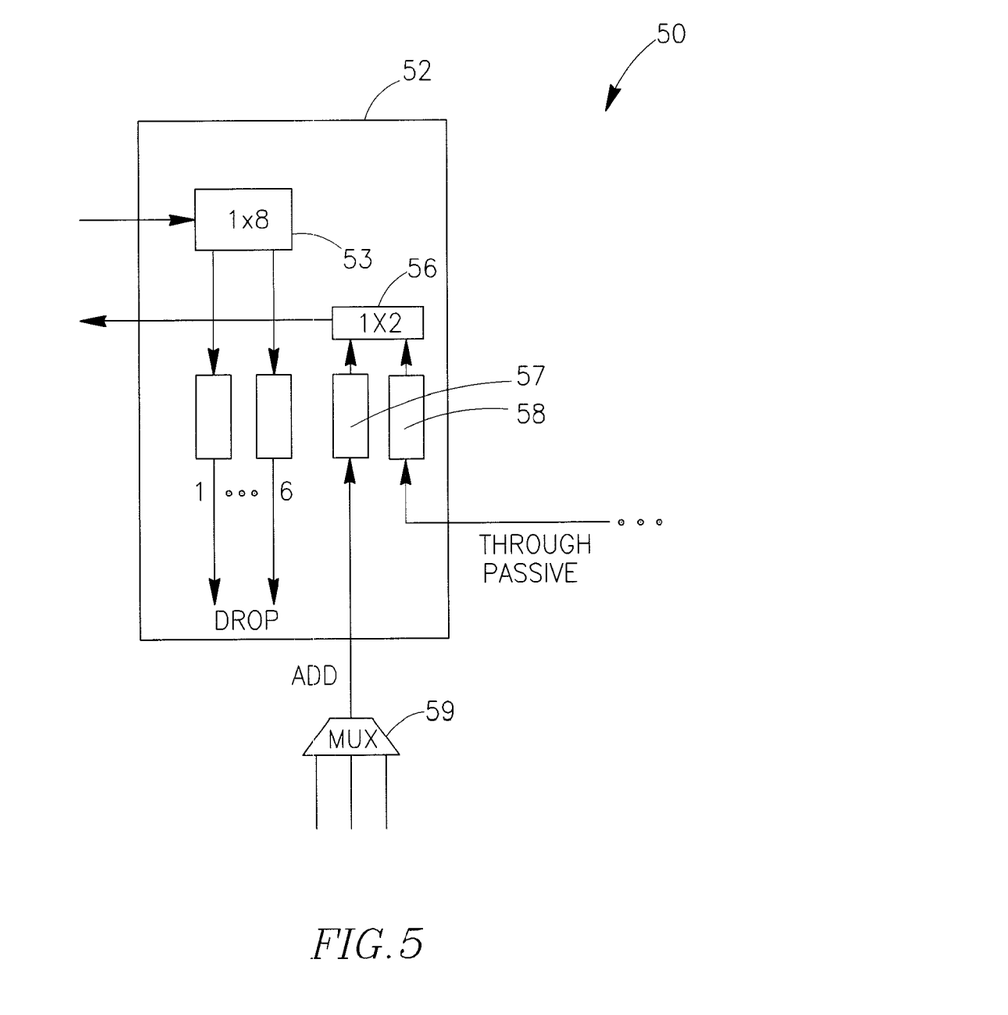
FIG. 5 illustrates another exemplary configuration of the proposed ROADM device, where both a through channel and an add channel are made reconfigurable, and where only one TFA unit and two optical splitters are utilized.

FIG. 5. In still a further embodiment of the proposed optical switching device, all optical channels (drop, add and through) may be reconfigurable (tunable), and an example will be shown below.

FIG. 5 illustrates how one or more add channels in the proposed device can be made reconfigurable at the cost of one and the same (common) TFA unit. For example, an add channel (an optical channel to be added) may be applied to a tunable filter of a suitable TFA unit (the common one, used for drop operation) of the proposed ROADM, and then combined, using an optical splitter/combiner, with through channels.

In the drawing, one of the OADM 50's portions, say a West portion 52 comprises a splitter 53 which, for example, divides the incoming light into 8 portions and applies six of them to tunable filters of the TFA array 55. It should be kept in mind that in practice, much more optical channels are comprised and may be obtained from the incoming light. The two remaining filters 58 and 57 are reserved for a through channel (to be filtered from the multiplexed signal arriving from an East portion of OADM) and for an added channel respectively. The added channel may be filtered out from an aggregated optical "add" signal produced by MUX 59. Splitter/combiner 56 combines outputs of the two tunable filters 47 and 48, and thus forms the output of the OADM 50, where both of the optical channels are reconfigurable (tunable). It should be emphasized, that no additional equipment is recruited in addition to the already existing in the OADM TFA array and two optical splitters. For more optical channels to be added/passed through, more tunable filters of the TFA array may be "rented", and splitters more complex than 1×2 can be used for combining thus obtained channels.

Figure 6:
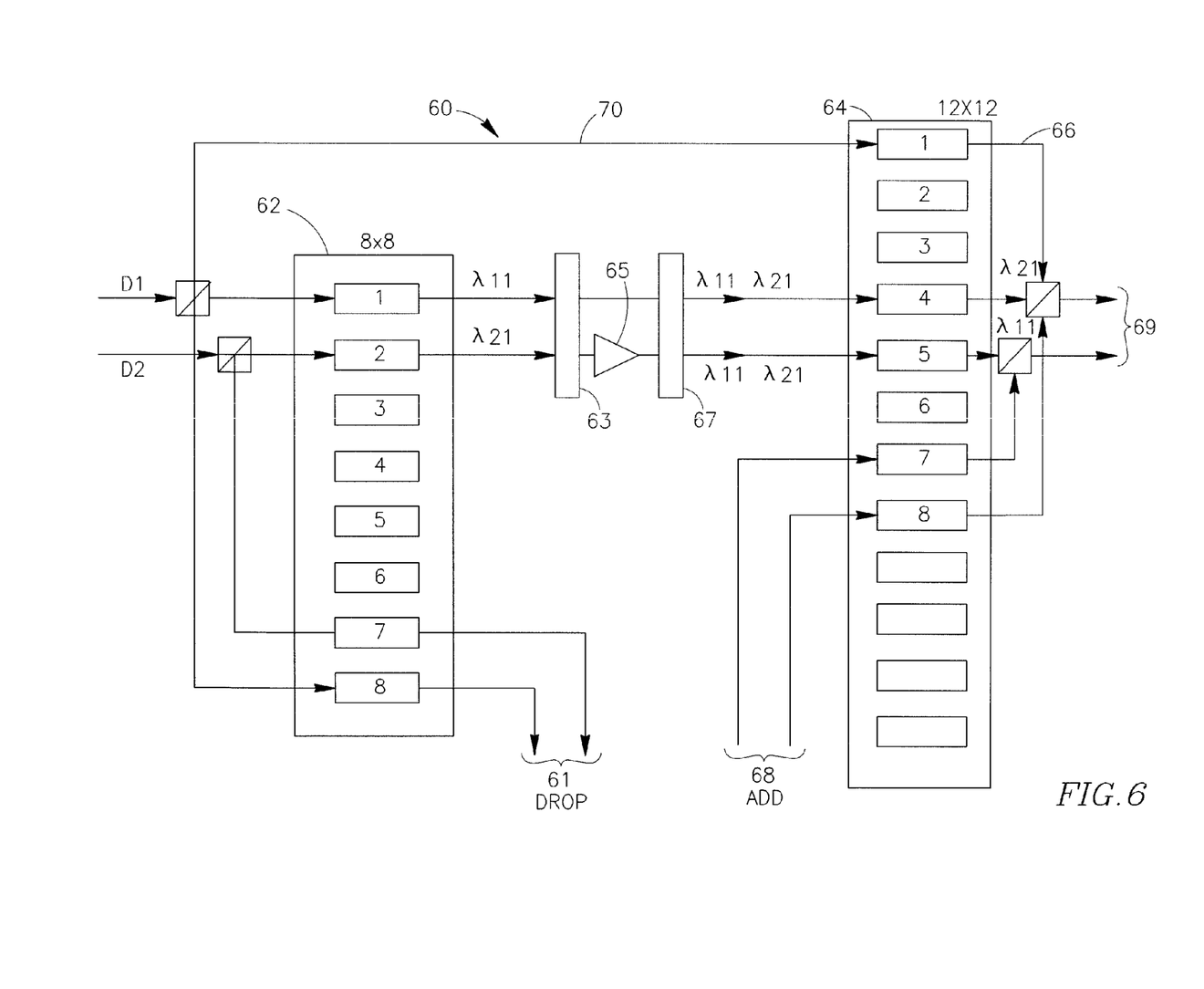
FIG. 6 illustrates a fragment of an exemplary cross-connecting equipment implementing the principle of the invention.

FIG. 6 illustrates a fragment of another optical switching device 60, being a cross-connecting switch which may serve for rearranging channels of two different optical networks. The switch may also be called a multi-degree node, a ring interconnect if it serves for connecting ring networks, etc.

Let optical channels incoming the device from one optical network are marked D1, and channels from another network will be marked D2. A first unit is a wavelength programmable array WPA accompanied by input splitters for D1 and D2 is actually a TFA unit 62 (8×8), intended for reconfigurable dropping of various optical channels of different networks. Say, two channels of different networks are filtered out by two tunable filters ($7^{th}$ and $8^{th}$) of the TFA 62 like drop channels of OADM. Such drop channels are marked 61; they may be directed to users associated with the part of network served by the RFA unit 62. Simultaneously, some optical channels of different networks D1 and D2 (two channels) are selected by other tunable filters ($1^{st}$ and $2^{nd}$) of the unit 62 and transferred to another TFA unit 64 (12×12) of the cross-connecting switch 60, like express channels of an OADM. To be transferred in the passive form, these different optical channels are combined by a combiner 63, amplified by an amplifier 65 and split again by a splitter 67 before the TFA unit 64 to be applied to predetermined tunable filters ($4^{th}$ and $5^{th}$) and then to reach output ports 69. Positions of the filters may be selected, and filters may be tuned so as to ensure the required output port for each specific optical channel and thus to achieve the goal of the switching device. Actually, a sole optical channel may be transferred from the input of the WSS/TFA unit 62 directly to the TFA unit 64, just by transferring all the incoming channels in the passive form 70 to one of the tunable filters ($1^{st}$) of unit 64; the required channel 66 will be filtered out. However, such a way is less effective since it would require additional splitting of the incoming energy.

Add channels 68 from a network portion associated with the TFA unit 64 may be entered into the TFA 64 (filters $7^{th}$ and $8^{th}$), and combined by optical combiners with other channels, in this example with channels outputted by filters $1^{st}$, $4^{th}$, $5^{th}$.

In the examples illustrated by FIG. 6, the drop, through and add channels are all reconfigurable.

It should be appreciated that though the present invention has been described on the example of OADM and a fragment of a cross-connecting device, the principle of using one and the same (common) TFA unit for colorlessly obtaining dropped(output) channels, configurable through-going channels and/or configurable add channels can be used in other optical switching systems which should be considered part of the invention.

The invention claimed is:

1. A reconfigurable optical switching device comprising a Tunable Filters Array (TFA) unit incorporating tunable optical filters, wherein said TFA unit is utilized both for performing a drop function of the device in a colorless and reconfigurable manner, and a through function of the device in a reconfigurable manner, wherein, among the tunable optical filters of the TFA unit, a group of the tunable optical filters serve for filtering out a respective group of drop optical channels, and one or more of remaining tunable optical filters are respectively adapted for filtering out at least one through optical channel, thereby one and the same said TFA unit being utilized for performing the drop function of the device in the colorless and reconfigurable manner, as well as the through function of the device in the reconfigurable manner, and wherein at least one remaining tunable optical filter of the TFA unit is adapted for filtering out an optical channel to be added to said device, thereby said TFA unit being utilized for performing also an add function of the device in the reconfigurable manner.

2. The optical switching device according to claim 1, being a reconfigurable OADM (ROADM).

3. The optical switching device according to claim 1, further comprising an East portion and a West portion for serving bidirectional transmission, wherein each of said portions comprises said TFA unit, and the switching device is adapted for transferring at least one through optical channel between said portions and for filtering out said through optical channel by a tunable optical filter of the TFA unit at the portion from which said optical through channel is to be outputted.

4. A method of arranging a reconfigurable through channel in a reconfigurable optical switching device, the method comprising:
provising the device with a TFA unit comprising tunable filters for implementing a drop function of the device,
forwarding to the TFA unit an optical channel to be expressly passed through the device,
selecting said optical channel by filtering it out using a tunable filter of the TFA unit not utilized for the drop function, and
connecting the selected channel to an express output of the device, thereby avoiding use of additional resources for said express channel.

5. The method according to claim 4, further comprising forwarding to the TFA unit, in a passive form, an optical channel to be added in the device, selecting said optical channel by filtering it out using, in said TFA unit, a tunable filter utilized neither for a drop function nor for a through function, and combining the selected optical channel with output of the device.

6. The method according to claim 4, wherein said device is a reconfigurable OADM (ROADM).

* * * * *